United States Patent
Avelar Araújo et al.

(10) Patent No.: US 12,529,148 B2
(45) Date of Patent: Jan. 20, 2026

(54) SLIDING MEMBER

(71) Applicant: MAHLE International GmbH, Stuttgart (DE)

(72) Inventors: Juliano Avelar Araújo, Coimbra (PT); Rafael Rabello, Murtede (PT)

(73) Assignee: Mahle International GmbH (DE)

( * ) Notice: Subject to any disclaimer, the term of this patent is extended or adjusted under 35 U.S.C. 154(b) by 105 days.

(21) Appl. No.: 18/376,439

(22) Filed: Oct. 3, 2023

(65) Prior Publication Data

US 2024/0110287 A1    Apr. 4, 2024

(30) Foreign Application Priority Data

Oct. 4, 2022 (EP) .................................. 22199584

(51) Int. Cl.
*C23C 28/00* (2006.01)
*F16J 9/26* (2006.01)

(52) U.S. Cl.
CPC ............... *C23C 28/325* (2013.01); *F16J 9/26* (2013.01)

(58) Field of Classification Search
CPC .................................. C23C 28/325; F16J 9/26
USPC ........................................................ 428/698
See application file for complete search history.

(56) References Cited

U.S. PATENT DOCUMENTS

| | | | |
|---|---|---|---|
| 4,570,946 A * | 2/1986 | Tsuchiya | F16J 9/26 277/443 |
| 5,718,437 A | 2/1998 | Tanaka | |
| 5,743,536 A | 4/1998 | Komuro | |
| 5,820,131 A | 10/1998 | Tanaka | |
| 6,631,907 B1 | 10/2003 | Onoda | |
| 10,436,324 B2 | 10/2019 | Avelar Araujo | |

FOREIGN PATENT DOCUMENTS

| | | | |
|---|---|---|---|
| CN | 108950480 A | * 12/2018 | ........... C23C 14/022 |
| DE | 102010052687 A1 | 5/2012 | |
| WO | 2005121403 A1 | 12/2005 | |

(Continued)

OTHER PUBLICATIONS

Gao et al., CN108950480 Google Patents machine translation printed Mar. 11, 2025, Dec. 7, 2018, entire translation (Year: 2018).*

(Continued)

*Primary Examiner* — Katherine A Christy
(74) *Attorney, Agent, or Firm* — Fishman Stewart PLLC

(57) ABSTRACT

A sliding member may include a metallic base, at least one intermediate bonding layer disposed on the metallic base, and a multilayer protective coating disposed on the intermediate bonding layer. The at least one intermediate bonding layer may be composed of at least one metal. The multilayer protective coating may include a plurality of CrAlN layers and a plurality of Cr(Al)N layers arranged in an alternating manner. The multilayer protective coating may include a plurality of periodicity layer groups, each of which may be defined by a CrAlN layer and an adjacent Cr(Al)N layer. The plurality of CrAlN layers may have a higher Al content than the plurality of Cr(Al)N layers. A thickness ratio of the CrAlN layer to the Cr(Al)N layer in each periodicity layer group may be from 1 to 10. The multilayer protective coating may have a total Al content of 15 to 40 atom-%.

19 Claims, 2 Drawing Sheets

Sliding member (1)

Cr(Al)N layer (4b)
CrAlN layer (4a)
Cr(Al)N layer (4b)
CrAlN layer (4a)
Cr(Al)N layer (4b)
CrAlN layer (4a)       = Periodicity layer group (4c)
Intermediate bonding layer (3)
Metallic base (2)

(56) References Cited

FOREIGN PATENT DOCUMENTS

WO     2018002072 A1    1/2018
WO     2020064041 A1    4/2020

OTHER PUBLICATIONS

Helmenstine, Alloy Definition and Examples in Chemistry, ThoughtCo, Aug. 16, 2019, URL: <https://www.thoughtco.com/alloy-definition-examples-and-uses-606371>, pp. 1-9 (Year: 2019).*
EP Search Report for EP-22199584, dated Nov. 9, 2022.
English abstract for DE-102010052687.

* cited by examiner

SLIDING MEMBER

CROSS-REFERENCE TO RELATED APPLICATION

This application claims priority to European Patent Application No. EP22199584.8, filed Oct. 4, 2022, the content of which is hereby incorporated by reference in its entirety.

TECHNICAL FIELD

The present invention relates to a sliding member, particularly for use in internal combustion engines or compressors, having a plurality of sequential coating layers composed of Al-containing chromium nitride. The resulting sliding member achieves excellent wear resistance and spalling resistance properties.

BACKGROUND

Internal combustion engines that operate according to Otto and Diesel cycles are used to traction-drive the vast majority of automotive vehicles and basically comprise two main parts: a cylinder block (where one or more cylinder(s) and the crankshaft are located), to which one or more cylinder heads are associated. To the crankshaft, pistons and rods are associated.

The space defined between the upper face of the piston, the cylinder wall and the base of the cylinder head corresponds to the combustion chamber, and in Diesel engines, in general, the combustion chamber(s) is (are) defined chiefly by a cavity or cavities provided on the head(s) of the piston(s).

Inside the combustion chamber(s), the engine converts the chemical energy produced by combustion of the inflammable mixture (fuel and air) into mechanical energy capable of transmitting movement to the wheels.

In order to assure homogenous combustion and without burning oil and also to avoid the passage of excess gases from the cylinder to the crankcase, it is necessary to use rings to provide good sealing of the gap between the piston and the cylinder wall.

Usually, modern four-stroke engines use three rings on each piston, two compression rings and one oil ring. The role of the compression rings is to prevent the passage of the combustion gases into the crankcase, whereas the function of the oil ring is to scrape the excess oil from the cylinder wall and return it to the crankcase, controlling the thickness of the "film" of oil and preventing it from being unduly burned.

Another important function of the rings is to act as a bridge to transmit heat from the piston to the cylinder wall/sleeve, where it is dissipated by way of the cooling system.

As a general rule, the piston rings, in particular the compression rings, are formed by a metallic base to which there is applied at least a coating layer, which comes into contact with the cylinder wall.

The role of the coating layer is among the most important because it seeks to confer to the ring low sliding attrition properties, superior resistance to spalling, hardness and tenacity. However, many of these properties are antagonistic and an increase in one of them means a loss in the performance of another, so the type of coating to be used is chosen based on the function of the engine working profile and on the forces to which the rings will be subjected during their useful life.

A series of sophisticated coatings was proposed by persons skilled in the art, each seeking to increment the desired properties. However, none of the coatings proposed up to now has been efficient in increasing, concomitantly, the internal stress absorption properties, superior hardness and low thickness, which significantly reduces spalling.

A first prior art is represented by U.S. Pat. No. 5,718,437, which relates to an oil-scraping ring having a coating of a $Cr_2N$ monolayer having a thickness of about 3 µm to 30 µm. According to said document, the coating layer of $Cr_2N$ provides a hardness between 1300 HV and 2000 HV and is applied by a process commonly known by persons skilled in the art as "ion plating".

A second prior art is represented by the Japanese patent JP 9196173, which discloses an invention very similar to U.S. Pat. No. 5,718,437, namely an oil-scraping ring having a coating of a $Cr_2N$ monolayer having a width of about 3 µm to 30 µm.

Furthermore, U.S. Pat. No. 5,820,131 relates to a piston ring having a coating formed by a single layer of $Cr_2N$ or a mixture of $Cr_2N$ and CrN having a width of 3 µm to 30 µm and a percentage of nitrogen, by weight, between 11% and 17%. The coating layer is applied by a process called "Physical Vapor Deposition" (PVD) and its hardness ranges from 1300 HV to 2000 HV.

U.S. Pat. No. 5,743,536 relates to a piston ring having a coating layer formed by at least a chromium nitride, applied by PVD. The chromium nitride comprises CrN, $Cr_2N$ or a mixture of CrN and $Cr_2N$ in a single phase. The document also specifies various values of thickness and porosity, besides disclosing various mechanical tests with products having coatings with various end arrangements. According to the patent, the coating presents excellent properties of abrasion resistance, spalling and burning.

Furthermore, WO 2005/121403 A1 discloses a piston ring which comprises a multilayer PVD-coating containing a plurality of Cr/CrN ($Cr_2N$) layers.

Lastly, U.S. Pat. No. 6,631,907 relates to a piston ring having a coating layer comprising CrN or $Cr_2N$, or a mixture of nitrides, applied by PVD. The document also discloses the application of a mixture of CrN with $Cr_2N$ and metallic Cr, and discloses details of percentages by weight of the components.

Thus, all solutions of the above-indicated prior art relate to the use of CrN or $Cr_2N$, as such or in a mixed state, to obtain a single layer of coating that has high rates of resistance to abrasion, spalling and burning.

However, there is a limit concerning a further increase of resistance to abrasion, spalling and burning in the prior art proposals, which varies depending on the percentage of CrN or $Cr_2N$ of the nitride layer and on any other elements added. In case an even greater improvement of these properties is desired, the single-layer nitrided coating is not a viable solution.

SUMMARY

Thus, it is the object of the present invention to provide a sliding member having a coating on chromium nitride basis providing a further improved wear resistance and spalling resistance.

Said object is achieved by the subject-matter of the independent claim(s). Advantageous embodiments are the subject-matter of the dependent claim(s).

The present invention is based on the general idea to use a multilayer protective coating on a metallic base, wherein the multilayer protective coating has alternating layers of CrAlN and Cr(Al)N, wherein each CrAlN layer has a higher Al content than each Cr(Al)N layer, and the thickness of each CrAlN layer is larger than the thickness of each Cr(Al)N layer.

CrAlN has recognized passivation characteristics and a high hardness due to the interstitial Al element. Sliding members, such as piston rings, for internal combustion engines demand a low friction, high wear, spalling and scuffing resistant coating. It is expected to achieve a higher wear resistance with a higher coating hardness.

The present inventors have found a new CrAlN/Cr(Al)N multilayer concept, where the alternating layers have a different concentration of Al, as outlined above, such that the wear resistance of the multilayer is considerably improved. Additionally, due to said multilayer concept a high spalling resistance was achieved, since each layer acts as a barrier for a dislocation movement. Furthermore, a high scuffing resistance is achieved by the rather thin Cr(Al)N layers having a low amount of Al.

Another advantage of the multilayer concept of this invention is a reduction of the volume of the element interdiffusion at the layer interfaces, since the layers having different Al concentrations also have different thicknesses in the manner as outlined above. This specific configuration has an impact on energy adsorption and relaxation dynamics in elastic regime, plastic deformation, crack initiation and propagation.

Furthermore, said multilayer concept is based on a continuous adaptation of the lattice parameters and thus a continuous adaptation of the energetic status (size) of the lattice. Thus, the stress gradients calculated at the coherent interfaces of CrAlN/Cr(Al)N are lower than those of pure CrN/CrAlN, for example. In the present multilayer concept the coherency strengthening hinders a dislocation motion based on the interaction of interface coherency stresses with the elastic stress fields of dislocations. The multilayer concept considers compositional gradients and lattice parameters variations inside the layers. The elimination of core areas eliminates a free crack propagation, since there is no stress gradient in core areas.

In addition, said multilayer concept can reduce the total hardness of the coating and mitigate any high wear on the frictional counter part by reducing the difference concerning lattice parameters and consequently reducing the maximum residual stress value for the same periodicity thickness of pairs of layers having different Al concentrations. Additionally, the thickness reduction of one of the layers (of the Cr(Al)N layer) will increase the average stress gradient appearing as an intrinsic elastic stress, which is considered to be generated by compositional differences and corresponding variations of lattice parameters.

Both stress amplitudes and stress gradients can affect hardness. Accordingly, steeper stress gradients may result in dislocation movements being more difficult. The smaller the periodicity thickness, the larger are the stress gradients developed near the interface, imposing greater stress barriers to dislocation movements.

The incorporation of Al into CrN promotes higher hardness, thermal and chemical stability. The present multilayer concept can also increase the coating hardness and tenacity.

Finally, the small concentration of Al in the coating as a whole can form a metastable solid solution of Al inside the face-centered cubic (fcc) CrN lattice, which increases the hardness. The CrAlN phase forms dense and adherent mixed Al and Cr oxide scales, which eventually suppress the oxygen diffusion into the coating, providing excellent oxidation resistance up to temperatures as high as 900° C.

Moreover, the addition of Al as a reactive element is considered to reduce the accumulation of voids at the bulk/scale interface (oxide film) to improve the mechanical properties of the coating by modifying its structure or to prevent the grain coarsening at elevated temperatures.

In view of the above effects, the new multilayer concept of the present invention provides a sliding member having a largely improved wear resistance and spalling resistance in view of the prior art concepts.

In particular, the present invention provides a sliding member, comprising: a metallic base, at least one intermediate bonding layer, which is composed of at least one metal and is present on the metallic base such that it covers at least part of the surface of the metallic base, and a multilayer protective coating present on the intermediate bonding layer, wherein the multilayer protective coating has alternating layers of CrAlN and Cr(Al)N, wherein two alternating layers of CrAlN and Cr(Al)N each form a periodicity layer group, the CrAlN layer has a higher Al content than the Cr(Al)N layer, the thickness ratio of the CrAlN layer to the Cr(Al)N layer in each periodicity layer group is 1<(thickness of CrAlN layer)/(thickness of Cr(Al)N layer)≤10, and the multilayer protective coating has a total Al content of 15 to 40 atom-%.

According to a preferred embodiment of the present invention, the metallic base is made of steel having 10 to 17 Weight % Cr, carbon steel or cast iron having compositions usually applied in the field of sliding members for internal combustion engines or compressors. However, the present invention is not limited to said materials for the metallic base and other materials may be used instead.

According to a preferred embodiment of the present invention, the metallic base is nitrided. The nitriding may be carried out by known methods, such as gas nitriding, salt bath nitriding or plasma nitriding, and results in a surface-hardening of the metallic base improving its overall wear resistance.

According to a preferred embodiment of the present invention, the at least one intermediate bonding layer is made of at least one, selected from the group consisting of Cr, Ni and Co, preferably Cr. The intermediate bonding layer improves the adhesion of the multilayer protective coating. The intermediate bonding layer applied to the metallic base material and also the functional coating are produced, for example, by a Physical Vapor Deposition (PVD) process.

According to a preferred embodiment of the present invention, the total thickness of the at least one intermediate bonding layer and the multilayer protective coating is from 6 µm to 70 µm, preferably from 6 µm to 60 µm, and more preferably from 10 µm to 50 µm. The thickness of layers of the present sliding member is measured, for example, by cross section evaluation.

According to a preferred embodiment of the present invention, the thickness ratio of the CrAlN layer to the Cr(Al)N layer in each periodicity layer group is 1.3 to 10, preferably 1.5 to 10, more preferably 1.7 to 10, still more preferably 1.5 to 5 and in particular 1.7 to 5.

According to a preferred embodiment of the present invention, the CrAlN layer contains 20 to 40 atom-% of Al, preferably 25 to 35 atom-% of Al, more preferably 27 to 32 atom-% of Al, and the Cr(Al)N layer contains 10 to 25 atom-% of Al, preferably 15 to 22 atom-% of Al, more preferably 18 to 20 atom-% of Al. For instance, the chemical composition can be measured by EELS (Electron Energy Loss Spectroscopy) or EDS (Energy Dispersive Spectroscopy).

According to a preferred embodiment of the present invention, each periodicity layer group has a thickness of less than 20 nm, preferably of less than 18 nm, more preferably of 15 nm or less, in particular of 5 to 15 nm.

According to a preferred embodiment of the present invention, the hardness of the multilayer protective coating is from 1600 to 2600 HV, preferably from 1800 to 2400 HV, and more preferably from 1900 to 2000 HV.

According to a preferred embodiment of the present invention, the internal compressive stress of the multilayer protective coating is from 1000 to 2500 MPa, preferably from 1200 to 2300 MPa, and more preferably from 1400 to 2000 MPa, measured by X-ray analysis.

According to a preferred embodiment of the present invention, the multilayer protective coating has a porosity of lower than 6%, preferably of lower than 5%, more preferably of lower than 4%, and in particular of lower than 3%, measured by an analysis software on the coating cross section image.

According to a preferred embodiment of the present invention, the multilayer protective coating has been made by cathodic arc deposition. Cathodic arc deposition methods and devices are well known to the skilled person. A specific cathodic arc deposition method and a corresponding device are discussed further below.

Furthermore, the present invention provides the use of a sliding member in an internal combustion engine or a compressor, wherein the sliding member is preferably a piston ring, a tappet, a valve or a cam. Further specific examples of the claimed use of the sliding member are an oil-scraping ring, a compression ring of a two-stroke engine and a ring of a piston compressor.

Further important features and advantages of the invention result from the dependent claims, the figures and the corresponding description of the figures.

It should be noted that the above-mentioned and below-discussed features may be used not only in the respective given combination, but also in different combinations or as such without being outside the scope of the present invention.

Preferred embodiments of the invention are shown in the figures and are further discussed in the following description, wherein the same reference numerals refer to similar or functionally identical components.

BRIEF DESCRIPTION OF THE DRAWINGS

It is schematically shown in

DETAILED DESCRIPTION

Figure 1:
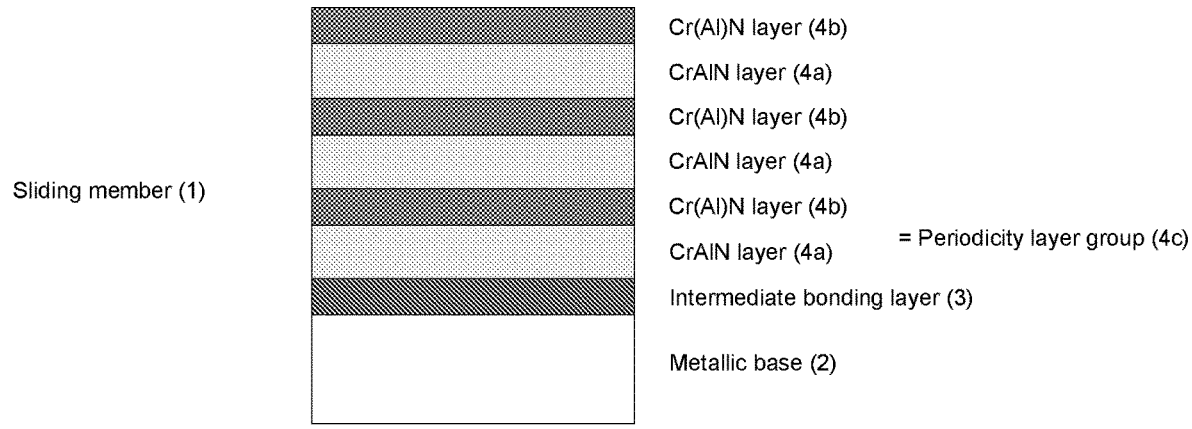
FIG. 1 shows a cross-sectional view of a sliding member (1) of the present invention, including a metallic base (2), an intermediate bonding layer (3) and a plurality of CrAlN and Cr(Al)N layers (4a, 4b) forming a multilayer protective coating (4)

According to FIG. 1, a cross-sectional view of a sliding member (1) of the present invention comprises a metallic base (2), an intermediate bonding layer (3) present on the metallic base (2), and a plurality of CrAlN and Cr(Al)N layers (4a, 4b) forming a multilayer protective coating (4) on the intermediate bonding layer (3). The plurality of CrAlN and Cr(Al)N layers (4a, 4b) are alternately arranged on the intermediate bonding layer (3), wherein the layer immediately above the intermediate bonding layer (3) is a CrAlN layer (4a). However, starting with a CrAlN layer (4a) is not compulsory, i.e., the first layer on the intermediate bonding layer (3) may also be a Cr(Al)N layer (4b). According to the present invention and as schematically shown in FIG. 1, the thickness of the CrAlN layers (4a) is set to be larger than the thickness of the Cr(Al)N layers (4b), as mentioned above. Furthermore, according to the present invention, the Al concentration in the CrAlN layers (4a) is set to be larger than the Al concentration in the Cr(Al)N layers (4b), as mentioned above. Two alternating layers of CrAlN and Cr(Al)N (4a, 4b) each form a periodicity layer group (4c), as it is exemplarily indicated for the two lowermost CrAlN and Cr(Al)N layers (4a, 4b) in FIG. 1.

Figure 2:
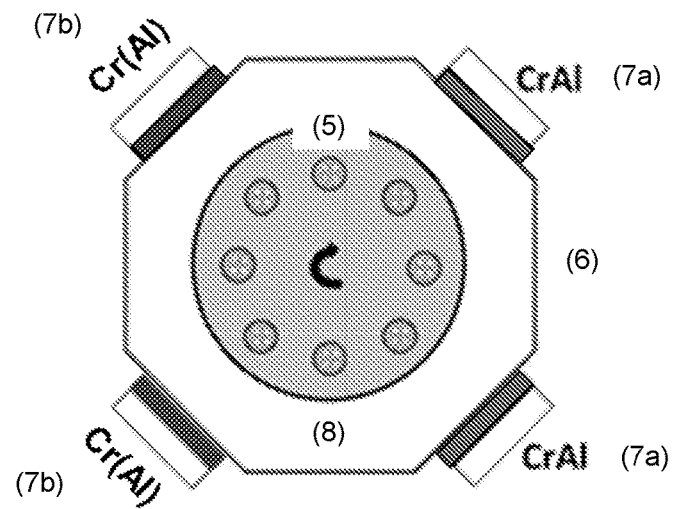
FIG. 2 shows a schematic plan view of a cathodic arc deposition device suitable for manufacturing a multilayer protective coating (4) of the present invention.

FIG. 2 shows a schematic plan view of a cathodic arc deposition device suitable for manufacturing a multilayer protective coating (4) of the present invention.

Nitride multilayers, such as CrAlN/Cr(Al)N used in the present invention, are isostructural and mutually miscible. Mixing of the constituents was defined by the PVD (Physical Vapour Deposition) chamber configuration to happen during deposition, leading to compositional gradients. The degree of mixing is a function of the deposition conditions, particularly regarding the cross-contamination between the targets during the process and mainly due to the own target composition (for instance, in the present case, half of the target with a high amount of Al in a range of 50 to 75 at-% Al and the other half of the target with Al in a range of 3 to 10 at-% Al).

According to FIG. 2, as an example for manufacturing a sliding member of the present invention, CrAlN/Cr(Al)N nanostructured multilayer protective coatings were deposited by "Cathodic Arc Physical Vapour Deposition" (CAPVD) onto gas nitrided martensitic stainless steel (AISI 440B) coupons (5) in an industrial-size chamber (6). Two cathodes [one package of Cr(Al) (7b) with an Al content of 3 to 10 at-% and one package of CrAl (7a) with an Al content of 50 to 75 at-%) in alternate positions were fed with their own power supply. By varying the rotating speed of the table (8) in the center of the chamber (6), a 30 μm thick coating was obtained with a thickness of the periodicity layer group (4c) of lower than 15 nm. The rotating speed controlled the time the substrate passes in front of each CrAl or Cr(Al) targets (7a, 7b) in such a way that it lead to the control of the periodicity thickness ensuring a very reduced cross contamination between the targets. The average deposition rate for all the depositions was 5 μm/h.

Figure 3:
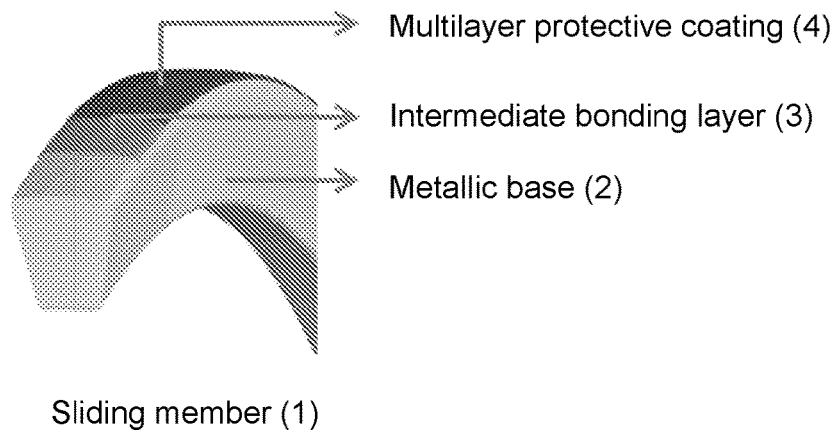
FIG. 3 shows a sliding member (1) of the present invention in the form of a piston ring.

FIG. 3 show a sliding member (1) of the present invention in the form of a piston ring, which may be manufactured by a CAPVD discussed above. The piston ring of FIG. 3 includes a metallic base (2) (only a ring segment of the piston ring is shown), an intermediate bonding layer (3) present on the outer ring surface of the metallic base (2), and a multilayer protective coating (4) present on the intermediate bonding layer (3).

Figure 4:
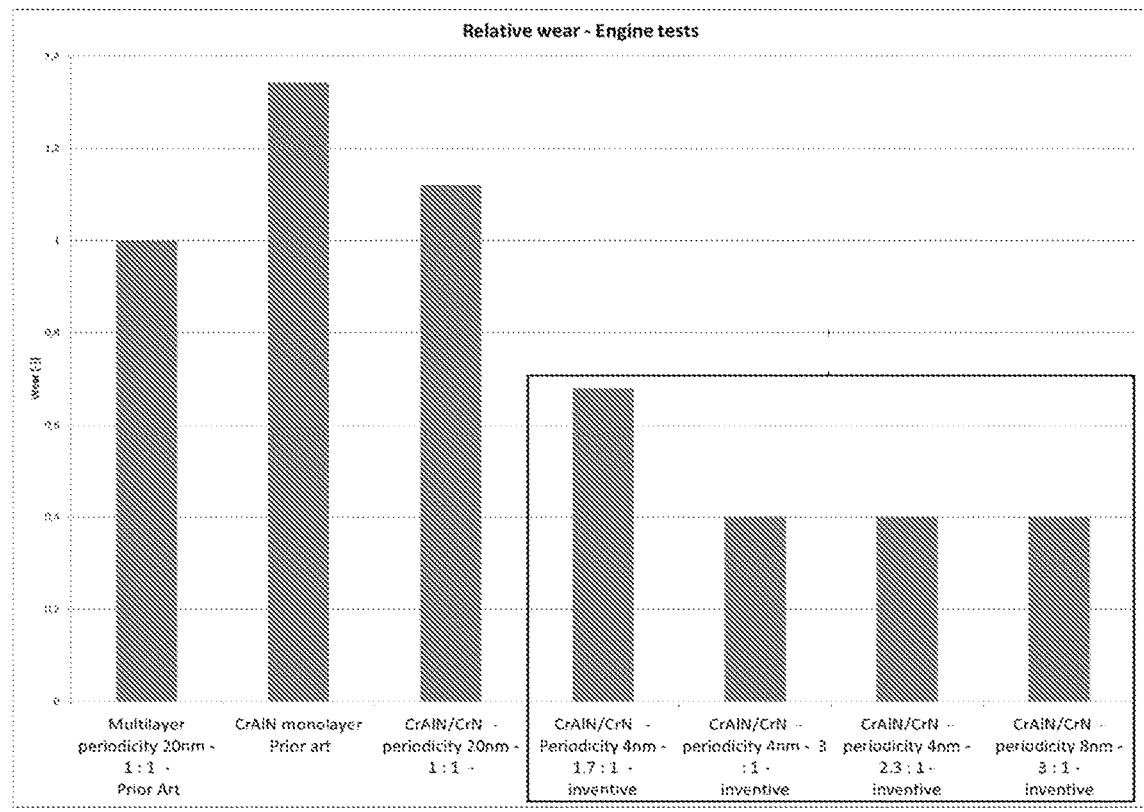
FIG. 4 shows a bar diagram for comparing the relative wear of prior art protective coatings and the multilayer protective coating according to the present invention.

Finally, FIG. 4 shows a bar diagram for comparing the relative wear of prior art protective coatings and the multilayer protective coating according to the present invention. All the engine tests were performed in an HDD platform with a bore diameter of 128 mm and power of 320 to 370 kW and with a duration of 250 hours up to 1.000 hours. The first bar shows the results of a prior art multilayer coating structure composed by NbN/CrN with a periodicity of 20 nm (proportion 1:1, 10 nm NbN and 10 nm CrN), while the second bar shows a CrAlN monolayer coating (without multilayers) and finally the third bar shows the results of the multilayer CrAlN/Cr(Al)N having a periodicity of 20 nm and also having a proportion of 1:1.

As shown in the remaining four bars encircled by a rectangle in FIG. 4, variants of CrAlN/Cr(AlN) according to the present invention were tested. As a result, it was found that the total coating wear was reduced significantly.

The invention claimed is:

1. A sliding member, comprising:
    a metallic base;
    at least one intermediate bonding layer composed of at least one metal and disposed on the metallic base such that the at least one intermediate bonding layer covers at least part of a surface of the metallic base; and
    a multilayer protective coating disposed on the intermediate bonding layer;
    wherein the multilayer protective coating includes a plurality of first layers and a plurality of second layers arranged in an alternating manner;
    wherein the multilayer protective coating further includes a plurality of periodicity layer groups, each periodicity layer group of the plurality of periodicity layer groups defined by a first layer of the plurality of first layers and an adjacent second layer of the plurality of second layers;
    wherein each of the plurality of first layers and each of the plurality of second layers are composed of Al-containing chromium nitride;
    wherein the plurality of first layers each have a higher Al content than each of the plurality of second layers;
    wherein a thickness ratio of the first layer to the second layer in each periodicity layer group of the plurality of periodicity layer groups is from 1 to 10;
    wherein the multilayer protective coating has a total Al content of 15 to 40 atom-%; and
    wherein:
        a total thickness of the at least one intermediate bonding layer and the multilayer protective coating is from 6 μm to 70 μm;
        a hardness of the multilayer protective coating is from 1600 to 2600 HV; and/or
        the multilayer protective coating has a porosity lower than 6%.

2. The sliding member according to claim 1, wherein the metallic base is composed of at least one of:
    steel having 10 to 17 mass-% Cr;
    carbon steel; and
    cast iron.

3. The sliding member according to claim 2, wherein the metallic base is nitrided.

4. The sliding member according to claim 1, wherein the at least one intermediate bonding layer includes at least one of Cr, Ni, and Co.

5. The sliding member according to claim 1, wherein the thickness ratio of the first layer to the second layer in each periodicity layer group of the plurality of periodicity layer groups is from 1.3 to 10.

6. The sliding member according to claim 1, wherein:
    the plurality of first layers include 20 to 40 atom-% of Al; and
    the plurality of second layers include 10 to 25 atom-% of Al.

7. The sliding member according to claim 1, wherein each periodicity layer group of the plurality of periodicity layer groups has a thickness of less than 20 nm.

8. The sliding member according to claim 1, wherein the hardness of the multilayer protective coating is from 1900 to 2000 HV.

9. The sliding member according to claim 1, wherein an internal compressive stress of the multilayer protective coating is from 1000 to 2500 MPa.

10. The sliding member according to claim 1, wherein the porosity of the multilayer protective coating is lower than 3%.

11. The sliding member according to claim 1, wherein the multilayer protective coating is a cathodic arc deposited layer.

12. An internal combustion engine, comprising the sliding member according to claim 1.

13. The internal combustion engine according to claim 12, wherein the sliding member is one of a piston ring, a tappet, a valve, and a cam.

14. A compressor, comprising the sliding member according to claim 1.

15. The compressor according to claim 14, wherein the sliding member is one of a piston ring, a tappet, a valve, and a cam.

16. The sliding member according to claim 1, wherein:
    the hardness of the multilayer protective coating is 1900 to 2000 HV;
    an internal compressive stress of the multilayer protective coating is 1400 to 2000 MPa; and
    the porosity of the multilayer protective coating is lower than 3%.

17. The sliding member according to claim 1, wherein:
    the total thickness of the at least one intermediate bonding layer and the multilayer protective coating is from 10 μm to 50 μm;
    each periodicity layer group of the plurality of periodicity layer groups has a thickness of 5 to 15 nm; and
    the thickness ratio of the first layer to the second layer in each periodicity layer group of the plurality of periodicity layer groups is from 1.7 to 5.

18. A sliding member, comprising:
    a metallic base;
    at least one intermediate bonding layer composed of at least one metal and disposed on the metallic base; and
    a multilayer protective coating disposed on the intermediate bonding layer, the multilayer protective coating including a plurality of first layers and a plurality of second layers arranged in an alternating manner;
    the multilayer protective coating further including a plurality of periodicity layer groups each defined by a first layer of the plurality of first layers and an adjacent second layer of the plurality of second layers;
    wherein each of the plurality of first layers and each of the plurality of second layers are composed of Al-containing chromium nitride;
    wherein, in each periodicity layer group of the plurality of periodicity layer groups, a thickness ratio of the first layer to the second layer is from 1.5 to 5;
    wherein the plurality of first layers each include 27 to 32 atom-% of Al;
    wherein the plurality of second layers each include 18 to 20 atom-% of Al;
    wherein the multilayer protective coating has a total Al content of 15 to 40 atom-%; and wherein a total thickness of the at least one intermediate bonding layer and the multilayer protective coating is from 10 µm to 50 µm.

19. A sliding member, comprising:

a metallic base;

at least one intermediate bonding layer disposed on the metallic base, the at least one intermediate bonding layer composed of at least one metal; and a multilayer protective coating disposed on the intermediate bonding layer, the multilayer protective coating including a plurality of first layers and a plurality of second layers arranged in an alternating manner;

the multilayer protective coating further including a plurality of periodicity layer groups each defined by a first layer of the plurality of first layers and an adjacent second layer of the plurality of second layers;

wherein each of the plurality of first layers and each of the plurality of second layers are composed of Al-containing chromium nitride;

wherein, in at least one periodicity layer group of the plurality of periodicity layer groups, i) the first layer has a higher Al content than the second layer and ii) a thickness ratio of the first layer to the second layer is from 1.5 to 5;

wherein the multilayer protective coating has a total Al content of 15 to 40 atom-%; and wherein:

a total thickness of the at least one intermediate bonding layer and the multilayer protective coating is from 6 µm to 70 µm;

a hardness of the multilayer protective coating is from 1600 to 2600 HV; and/or the multilayer protective coating has a porosity lower than 6%.

* * * * *